(12) United States Patent
De Brebisson

(10) Patent No.: US 8,539,015 B2
(45) Date of Patent: Sep. 17, 2013

(54) PERFORMING A BINARY CODED DECIMAL (BCD) CALCULATION

(75) Inventor: Cyrille De Brebisson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1369 days.

(21) Appl. No.: 12/235,213

(22) Filed: Sep. 22, 2008

(65) Prior Publication Data

US 2010/0030834 A1    Feb. 4, 2010

Related U.S. Application Data

(60) Provisional application No. 61/085,459, filed on Aug. 1, 2008.

(51) Int. Cl.
*G06F 7/38*    (2006.01)

(52) U.S. Cl.
USPC .......................................... 708/490; 708/525

(58) Field of Classification Search
None
See application file for complete search history.

(56) References Cited

U.S. PATENT DOCUMENTS

| | | | | |
|---|---|---|---|---|
| 4,245,328 A | * | 1/1981 | Negi et al. | 708/673 |
| 5,508,951 A | * | 4/1996 | Ishikawa | 708/552 |
| 5,636,156 A | * | 6/1997 | Mikan et al. | 708/712 |
| 5,638,314 A | * | 6/1997 | Yoshida | 708/656 |

* cited by examiner

*Primary Examiner* — Michael D Yaary

(57) ABSTRACT

To perform a binary-coded decimal (BCD) calculation, a processor receives values on which the BCD calculation is to be performed. A carry resulting from the BCD calculation is stored in a flag register of the processor, and the carry stored in the flag register is used to compute a result of the BCD calculation.

14 Claims, 2 Drawing Sheets

US 8,539,015 B2

PERFORMING A BINARY CODED DECIMAL (BCD) CALCULATION

CROSS-REFERENCE TO RELATED APPLICATION

This claims the benefit under 35 U.S.C. §119(e) of U.S. Provisional Application Ser. No. 61/085,459, filed Aug. 1, 2008, which is hereby incorporated by reference.

BACKGROUND

In many computers and processors, binary-coded decimal (BCD) is used. BCD refers to an encoding for decimal numbers in which each digit (that can vary between 0 and 9) is represented by a corresponding collection of binary bits. In many computers or processors, a BCD digit is usually represented by four binary bits.

BCD encoding allows for an electronic device to output decimal digits easily for purposes of printing or display. BCD encoding also allows for faster decimal calculations in electronic devices.

An issue associated with performing BCD calculations is that some conventional BCD algorithms are relatively inefficient. A challenge of BCD algorithms is how to handle carrys as two decimal digits are added. For example, if the decimal number 59 is to be added to 45, the addition of the least significant decimal digits (9 and 5, respectively) of the above two numbers would result in a carry, and the addition of the most significant digits of the two numbers above would also result in a carry.

One conventional algorithm for performing BCD calculations involves processing the addition on a nibble-by-nibble basis (a nibble is made up of four binary bits), starting with the least significant nibble (corresponding to the least significant decimal digit), and proceeding to the most significant nibble one nibble at a time. If the addition of two nibbles (representing two respective decimal digits) results in a value that is greater than binary 1001 (note that a BCD number can vary between binary values 0000 and 1001, corresponding to decimal digits 0 thru 9), then a carry would result. To propagate the carry, the resulting number (from the addition of the two nibbles) that is greater than binary 1001 is summed with binary 0110 (equivalent to decimal 6) to generate the proper result that effectively includes a carry that is propagated to the next more significant decimal digit. The nibble-by-nibble algorithm that involves checking if a result of the addition of two digits would exceed decimal 9 and the resulting addition with decimal 6, if the result would exceed decimal 9, is a relatively inefficient algorithm that can consume many processor cycles.

Alternative faster BCD algorithms have been used, but such faster BCD algorithms come at the expense of losing a digit to compensate for the possibility of a carry from the most significant decimal digit. For example, to add two 16-digit decimal numbers, a conventional fast BCD algorithm would perform 15-digit additions, since the last digit has to be saved for representing a carry.

BRIEF DESCRIPTION OF THE DRAWINGS

Some embodiments of the invention are described, by way of example, with respect to the following figures.

DETAILED DESCRIPTION

In accordance with some embodiments, binary-coded decimal (BCD) calculations, and more specifically, BCD additions, are performed using an algorithm that takes advantage of a standard carry flag contained in a register set of a processor. A register set refers to a collection of storage elements in the processor that are used to store status and/or control information. The carry flag of the register set in the processor allows the carry for the most significant digit of a BCD addition to be stored. The "carry" of a BCD addition refers to a value that is transferred to the next most significant BCD digit because the sum exceeded the value 9. By using the carry flag of the register set in the processor to store the carry, the BCD addition does not have to lose one of the BCD digits for storing the carry. For example, assuming the BCD addition is of two 16-digit decimal numbers (represented as 64 bits), then a 16-digit addition can be performed, rather than just a 15-digit addition in which the most significant BCD digit is used to store a potential carry. Conventional algorithms for performing BCD additions yield just 15 digits for 64-bit operations, or 7 digits for 32-bit operations. In accordance with some embodiments, BCD additions can yield 16 digits for 64-bit operations, 8 digits for 32-bit operations, and so forth In other words, with some embodiments of the invention, an extra BCD digit is provided in performing the BCD addition.

To enable the state of the carry flag to be maintained in the register set, a processor is used that has the ability to maintain the carry flag un-changed throughout a sequence of instructions for performing the BCD calculation.

BCD refers to an encoding for decimal numbers in which each digit (that can vary between 0 and 9) is represented by a corresponding collection of binary bits. In many computers or processors, a BCD digit is usually represented by four binary bits.

In accordance with some embodiments, assuming that an addition of two BCD numbers (a and b) is to be performed, then the algorithm according to some embodiments pre-adjusts one of the two BCD numbers (e.g., a) by adding a decimal 6 to each of the BCD digits of a, which is basically an assumption that a carry will occur when adding each digit of a to the corresponding digit of b. Note that this assumption may not turn out to be true after the addition is performed; if that is the case, then for each digit of the result (a+b) for which a carry did not occur, then the decimal 6 is subtracted from that digit of the result.

Figure 1:
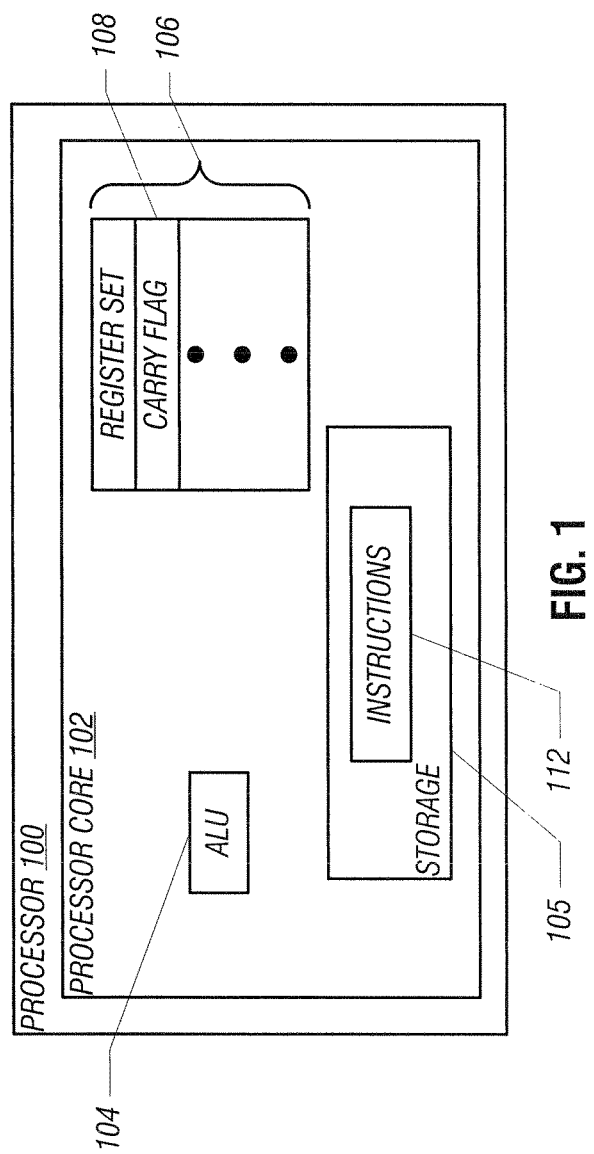
FIG. 1 is a block diagram of an exemplary processor that incorporates an embodiment.

The BCD algorithm according to some embodiments can be implemented in an exemplary processor 100 depicted in FIG. 1, which includes a processing core 102 that has an arithmetic logic unit (ALU) 104. In one example, the processor 100 can be an ARM central processing unit (CPU). The architecture of an ARM CPU is developed by ARM Limited. In other examples, the processor 100 can be another type of processor.

The processing core 102 also includes a register set 106 (that has a number of different types of registers). The register set 106 includes a register (flag register or status register) that contains a carry flag 108. The carry flag 108 is accessible by the ALU 104 for purposes of storing carry information corresponding to the most significant BCD digit when performing an addition of two BCD numbers.

Although depicted as being part of an ALU in a processing core of a processor, note that algorithms according to some embodiments for performing BCD calculations can be implemented in software (rather than hardware), where the software is executable on a processor. Alternatively, algorithms according to some embodiments can also be performed in other types of electronic devices.

Instructions 112 for performing BCD calculations according to some embodiments can be stored in a storage 105 of the processor 100.

Figure 2:
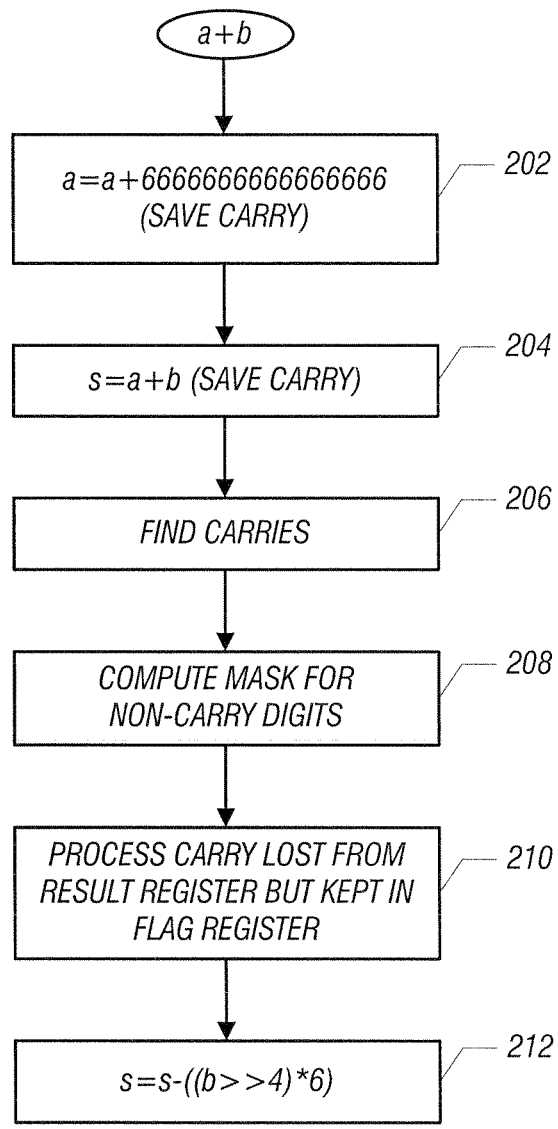
FIG. 2 is a flow diagram of a process of performing a binary-coded decimal (BCD) calculation according to an embodiment.

FIG. 2 is a flow diagram of performing a BCD addition (of BCD numbers a and b) in accordance with an embodiment. It is assumed that each of a and b is made up of 16 BCD digits (64 binary bits). In other implementations, a and b can have different numbers of BCD digits.

The algorithm of FIG. 2 first performs (at 202) a pre-adjustment of BCD number a that assumes that a carry will occur for each of the BCD digits in the result a+b. This pre-adjustment involves adding a to 6666666666666666 (a sequence of constant digits, in this case, a sequence of 6s) and saving the result in a. In other words, each BCD digit is summed with 6. Adding a 6 to each BCD digit allows for relatively easy detection of which digit addition results in a carry. As explained further below, the extra 6 will be removed later by the algorithm from each BCD digit if in fact the sum of a and b did not result in a carry for the corresponding BCD digit.

The addition of a and 6666666666666666 uses an instruction of the processing core 102 in which the carry (due to addition of the most significant digits of a and 6666666666666666) is saved in the carry flag 108 of the corresponding register in the processing core 102. In one implementation, such an addition instruction is adds, where the "s" is an indication that any carry is saved in the carry flag 108.

Although the algorithm of FIG. 2 depicts the pre-adjustment being made to a, it is noted that alternatively, b can be pre-adjusted by adding 6666666666666666.

Next, the algorithm performs (at 204) an addition of a (adjusted a) with b and saves the result in s (s=a+b). The addition also uses the addition instruction adds (note the presence of suffix "s" in adds) in which the carry resulting from the addition is saved in the carry flag 108.

In accordance with one exemplary implementation, the sequence of assembly language instructions that can be issued to perform tasks 202 and 204 is depicted below:

```
ldr    lr, cte66666666
adds   r0, r0, lr    // a=a+666...
adc    r1, r1, lr
ldr    lr, cte88888888
adds   r4, r0, r2    // s=a+b
adcs   r5, r1, r3    // here the result of the carry is kept in the flag register
                     at no extra cost and can be used later, providing access to
                     the 16th digit.
```

Note that several registers are used, including registers r0, r1, r2, r3, r4, r5, and 1r. In this example, it is assumed that the processor 100 is a 32-bit processor such that each processor is 32 bits in length; as a result, two registers are used to represent each 16-digit BCD number a or b (or any intermediate result). In an alternative example, if a 64-bit processor 100 is used, just one register can be used to store each of the operands a and b, and the sum s.

Registers r0 and r1 are used to store the digits for a, and r2 and r3 are used to store the digits for b. Registers r4 and r5 are used to store the digits for the sum s, and register 1r is used to store a constant. Collectively, the registers r4 and r5 are referred to as the "result register" to store the sum s. Initially, the constant that is loaded into register 1r is 6666666666666666, which is used to pre-adjust a.

In the sequence of instructions above, the carry from the sum a+b is kept as the carry flag 108 (FIG. 1) in the flag register of the processor 100. The instruction adcs in the last instruction above specifies an addition of the contents of registers r1 and r3, plus the carry from the sum of r0 and r2. The "s" at the end of adcs indicates that any carry of the sum is kept in the carry flag 108 of the processor register set.

The instruction 1dr 1r, cte88888888 above pre-loads the constant 88888888 into register 1r for use later (explained further below).

In the flow depicted in FIG. 2, the algorithm next finds (at 206) digits associated with carrys. This is performed by using the following two exclusive-or operations (where ^ denotes an exclusive-or operation):

$b = b \hat{\ } a,$ $b = b \hat{\ } s.$

The above two computations can be combined to provide the following operation:

$b = a \hat{\ } b \hat{\ } s.$

As a result of the above operation, the least significant bit of each digit of b is used to indicate whether there is a carry from the next less significant digit. The parity of each BCD digit of s is equal the exclusive-or of: parity of BCD digit of a, parity of BCD digit b, and carry from the previous BCD digit. The parity of a BCD digit is 0 if the number of 1s in the BCD digit is odd; on the other hand, the parity of the BCD digit is 1 if the number of 1s in the BCD digit is even. The operation $b=b\hat{\ }a$ above calculates the combined parity of BCD digits of a and b. The operation $b=a\hat{\ }b\hat{\ }s$ removes the combined parity of digits a and b from the parity of the sum s, and provides the carry bit for each BCD digit of sum s.

An exemplary sequence of instructions to perform the exclusive-or operations above is provided below:

```
eor   r2, r0, r2    // b=a^b
eor   r3, r1, r3
eor   r2, r2, r4    // b=b^s
eor   r3, r3, r5
```

The least significant bit of b will have a 1 value to indicate a carry from the next less significant bit. For example, assume that the sum s has digits s15, s14, . . . , s1, s0, and b has digits b15, b14, . . . , b1, b0. Then digit $b_j$ (j being any one of 0 to 15) will have a least significant bit that has a 0 value to indicate that digit $s_j$ contains a carry from digit $s_{j-1}$ (the next less significant digit).

The algorithm next computes (at 208) the mask for non-carry digits by performing the following operation:

$b = \sim b \& 0x1111111111111111.$

Note that as a result of task 206, the algorithm has a result of length 64 bits (assuming each of a and b are 64 bits long in this example). Of the 64 bits, 16 bits are of interest (the least significant bit of each BCD digit that indicates presence of a carry). Thus, it is desired to clear the remaining 48 bits, which are the three most significant bits of each BCD digit. By clearing the three most significant bits of each digit in b, just the least significant bit of each digit of b is left, where the least significant bit can have a 0 or 1 value to indicate whether or not the digit has a carry from the next less significant digit.

If the carry bit for digit $b_j$ (j being any one of 0 to 15) is not set (in other words, no carry), then that means that the algorithm should remove (subtract) 6 from the next less significant digit $b_{j-1}$. To enable the subtraction of the value 6 from non-carry BCD digits, each carry bit of b is inverted (~b), such that "0" indicates presence of a carry while "1" indicates no carry. Note that the code for performing a DCB subtract can be derived easily since a−b is equivalent to a+(9999999999999999−b)+1 (modulo 10^16) and that 999999999999999−b cannot have any carry on any of the digits. A further optimization can be achieved by noticing that 9999999999999999−b+6666666666666666 is equivalent to a bitwise negation of b; therefore, the DCB subtraction algorithm will be similar to the addition one with the exception that a+=0x6666666666666666 will be replaced by b=~b; a++.

At this point, the carry bit for BCD digit $b_j$ is the least significant bit of the next more significant BCD digit $b_{j+1}$. Therefore, the algorithm should shift the bitfield to locate the bit indicating the carry caused by digit $b_j$ in the same regions of the registers as digit $b_j$ (rather than digit $b_{j+1}$).

An exemplary instruction sequence for performing the above operations associated with 208 is provided below:

```
bic   r2, lr, r2, lsr #1     // (~b>>1) & 0x8888888888888888
sub   r2, r2, r3, asl #31
bic   r3, lr, r3, lsr #1
```

The instruction bic is a bit clear instruction. Note that a shift operation normally takes three operations, but if the bifield is shifted by just 1 bit to the right (which would place the carry bit for digit $b_j$ in the most significant bit of digit $b_j$), then the shift ability of an ARM processor can be used to perform in one operation the following: (~b>>1) & 0x88888888 (operation performed on the lower 32 bits).

The sub instruction above is used to handle the carry for BCD digit 7 (which is currently held as the least significant bit of BCD digit 8. The last bic instruction handles the upper 32 bits of b; since the shift is done on-the-fly, a logical and operation is performed between the upper 32 bits of b and 0x88888888 (which is 0x11111111 shifted by 1 to the right).

As a result of the above operations, the most significant bit of each BCD digit indicates whether or not there is a carry associated with the BCD digit (of the sum s). This most significant bit of each BCD digit is referred to as the "carry bit."

It is noted that if the processor has 64-bit registers, rather than 32-bit registers (as assumed above), then the above operations can be performed with just one instruction.

Next, the algorithm processes (at 210) the carry that was "lost" from the result register (r4 and r5 collectively) due to the 64-bit length of the result register. Note, however, that this "lost" carry has actually been maintained as the carry flag 108 (FIG. 1) in the flag register, in accordance with some embodiments. If the carry flag 108 is set (to indicate that the sum s=a+b resulted in a carry), then the value 6 does not have to be removed from the most significant digit of the sum s. As a result, the carry bit of BCD digit 16 indicating the need to remove the value 6 is cleared from the BCD digit 16. However, if the carry flag 108 is not set, indicating no carry from summing a and b, then the value 6 does have to be removed from the most significant digit of sum s. In the latter scenario, the carry bit of BCD digit 16 is not cleared, which means that the value 6 would be later subtracted from BCD digit 16.

An exemplary instruction to perform the above is as follows:

```
subcs r3, r3, #0x80000000
```

Note that the processor 100 has maintained the carry flag 108 in its register set in performing the various operations discussed above. This maintained carry flag 108 is available to compute a result of the BCD addition, as discussed above.

Next, the following operation is performed (at 212):

$$s=s-((b>>4)*6)$$

The above operation above removes the decimal digit 6 from all non-carry digits. In other words, if the carry bit (the most significant bit of each BCD digit of b) is set to value "1", then that indicates no carry, such that the decimal digit 6 that was added to pre-adjust a has to be removed. Removing the value 6 is equivalent to removing the value 4 followed by removing the value 2 (6=4+2). In one implementation, to remove the value 4, (carry bit*4) is removed, and to remove the value 2, (carry bit*2) is removed. Note that if he carry bit has value "0," then the value 0 is removed (subtracted).

An exemplary sequence of instructions to perform task 212 is provided below:

```
subs  r4, r4, r2, lsr #2
sbc   r5, r5, r3, lsr #2
subs  r0, r4, r2, lsr #1
sbc   r1, r5, r3, lsr #1
```

Although exemplary machine language instructions have been provided to illustrate specific instructions that can be used to implement the procedure of FIG. 2, it is noted that different instructions can be used in other implementations.

By using a technique according to some embodiments, fast BCD addition can be achieved without having to sacrifice a BCD digit to contain the carry. This is accomplished by using the carry flag contained in a flag register of a processor on which the BCD addition is calculated.

The instructions to provide the algorithm to implement the BCD addition can be loaded for execution by a processor, which can include a microprocessor, microcontroller, processor module or subsystem (including one or more microprocessors or microcontrollers), or another control or computing device. A "processor" can refer to a single component or to plural components.

The instructions are stored in a storage device, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of performing a binary-coded decimal (BCD) addition, comprising:
    receiving, in a processor, first and second values on which the BCD addition is to be performed;
    adding the first value to a sequence of constant digits to produce a modified first value;
    adding the modified first value and the second value to produce a sum having BCD digits;
    determining which of the BCD digits of the sum is not associated with a carry, wherein the determining comprises performing an operation on the modified first value, the second value, and the sum, and using a result of the operation to identify which of the BCD digits of the sum is not associated with a carry;
    storing a carry resulting from the adding of the modified first value and the second value in a flag register of the processor, where the carry stored in the flag register is a value to be transferred to a next most significant BCD digit;
    using the carry stored in the flag register to compute a result of the BCD addition; and
    subtracting corresponding constant digits from BCD digits of the result of the BCD addition for those BCD digits of the result that are not associated with a carry as identified by the determining.

2. The method of claim 1, wherein storing the carry in the flag register comprises maintaining the carry in the flag register as the processor performs various instructions in performing the BCD addition, wherein the maintained carry is made available to compute the result of the BCD addition.

3. The method of claim 1, wherein storing the carry in the flag register comprises storing the carry in the flag register of a register set of the processor.

4. The method of claim 3, wherein storing the carry in the flag register of the register set of the processor comprises storing the carry in the flag register of the register of an ARM processor.

5. The method of claim 1, further comprising invoking instructions to perform the BCD addition, wherein the instructions are instructions specifying that any carry from the BCD addition is stored in the flag register.

6. The method of claim 1, wherein performing the operation comprises performing an exclusive-OR operation.

7. A processor comprising:
    a flag register; and
    a processing core to:
        receive first and second operands for a binary-coded decimal (BCD) addition, the first and second operands having corresponding BCD digits;
        add the first operand with a sequence of constant digits to produce a modified first operand;
        add the modified first operand and the second operand to produce a sum having BCD digits;
        determine which of the BCD digits of the sum is not associated with a carry, wherein the determining comprises performing an operation on the modified first operand, the second operand, and the sum, and using a result of the operation to identify which of the BCD digits of the sum is not associated with a carry;
        store a carry resulting from the adding of the modified first operand and the second operand in the flag register, where the carry stored in the flag register is a value to be transferred to a next most significant BCD digit; and
        use the carry stored in the flag register to compute a result of the BCD addition; and
        subtract corresponding constant digits from BCD digits of the result of the BCD addition for those BCD digits of the result that are not associated with a carry as identified by the determining.

8. The processor of claim 7, wherein the processing core is enabled to maintain the carry in the flag register as the processor core performs various instructions in performing the BCD addition.

9. The processor of claim 7, wherein performing the operation comprises performing an exclusive-OR operation.

10. An article comprising at least one non-transitory processor-readable storage medium containing instructions that when executed cause a processor to:
    receive first and second operands on which a binary-coded decimal (BCD) addition is to be performed, the first and second operands having corresponding BCD digits;
    add the first operand with a sequence of constant digits to produce a modified first operand;
    add the modified first operand and the second operand to produce a sum having BCD digits;
    determine which of the BCD digits of the sum is not associated with a carry, wherein the determining comprises performing an operation on the modified first operand, the second operand, and the sum, and using a result of the operation to identify which of the BCD digits of the sum is not associated with a carry;
    store a carry resulting from the adding of the modified first operand and the second operand in a flag register of the processor, where the carry stored in the flag register is a value to be transferred to a next most significant BCD digit;
    use the carry stored in the flag register to compute a result of the BCD addition; and
    subtract corresponding constant digits from BCD digits of the result of the BCD addition for those BCD digits of the result that are not associated with a carry as identified by the determining.

11. The article of claim 10, wherein performing the operation comprises performing an exclusive-OR operation.

12. An article comprising at least one non-transitory processor-readable storage medium containing instructions that when executed cause a processor to:
    receive operands on which a binary-coded decimal (BCD) addition is to be performed, the operands having corresponding BCD digits;
    pre-adjust one of the operands by adding predefined constant values;
    add the pre-adjusted operand and at least another of the operands as part of the BCD addition;
    store a carry resulting from the BCD addition in a flag register of the processor, where the carry is a value to be transferred to a next most significant BCD digit;
    use the carry stored in the flag register to compute a result of the BCD addition, subsequently determine which of BCD digits of the result of the BCD addition are not associated with a carry, wherein the determining comprises performing an operation on the pre-adjusted operand, the at least another operand, and a sum of the pre-adjusted operand and the at least another operand, and using a result of the operation to identify which of the BCD digits of the result of the BCD addition is not associated with a carry; and for those BCD digits of the result of the BCD addition not associated with a carry as identified by the determining, subtract the predefined constant values from those BCD digits.

13. The method of claim 1, wherein the carry stored in the flag register is to be transferred to the next most significant BCD digit due to a sum of less significant digits of the modified first value and the second value exceeding a value of nine.

14. The article of claim 10, wherein the carry stored in the flag register is to be transferred to the next most significant BCD digit due to a sum of less significant digits of the modified first operand and the second operand exceeding a value of nine.

* * * * *